US010831911B2

(12) United States Patent
Chung et al.

(10) Patent No.: US 10,831,911 B2
(45) Date of Patent: Nov. 10, 2020

(54) METHOD, COMPUTER PROGRAM PRODUCT AND PROCESSING SYSTEM FOR GENERATING SECURE ALTERNATIVE REPRESENTATION

(71) Applicant: INDUSTRIAL TECHNOLOGY RESEARCH INSTITUTE, Hsinchu (TW)

(72) Inventors: Shen-Ming Chung, Chiayi County (TW); Tzi-Cker Chiueh, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 469 days.

(21) Appl. No.: 15/847,298

(22) Filed: Dec. 19, 2017

(65) Prior Publication Data
US 2019/0188396 A1 Jun. 20, 2019

(51) Int. Cl.
*G06F 21/00* (2013.01)
*G06F 21/62* (2013.01)
(Continued)

(52) U.S. Cl.
CPC ...... *G06F 21/6209* (2013.01); *G06F 16/4393* (2019.01); *G06F 21/31* (2013.01);
(Continued)

(58) Field of Classification Search
CPC ............ G06F 21/6209; G06F 16/4393; G06F 21/6227; G06F 21/31; G06F 21/602; G06F 7/588
See application file for complete search history.

(56) References Cited

U.S. PATENT DOCUMENTS 7,373,500 B2 5/2008 Ramelson et al.
8,694,646 B1 4/2014 Kothari et al.
(Continued)

FOREIGN PATENT DOCUMENTS

CN 102916963 A 2/2013
CN 103118089 A 5/2013
(Continued)

OTHER PUBLICATIONS

Eu-Jin Goh, "Secure Indexes", Stanford Edu., Mar. 16, 2004, pp. 1-19, https://eprint.iacr.org/2003/216.pdf, US.
(Continued)

*Primary Examiner* — Kendall Dolly
(74) *Attorney, Agent, or Firm* — Muncy, Geissler, Olds & Lowe, P.C.

(57) ABSTRACT

The application discloses a method, a computer program product and a processing system for generating a secure alternative representation. The method in a processing system including: providing, by the processing system, a first sequence including a plurality of first values; providing, by the processing system, a plurality of storage cells belonging to a plurality of groups, each of the groups having one or more storage cells; performing, by the processing system, for each of the storage cells a symbol-deriving and cell-filling procedure; composing, by the processing system, a queue for each of the groups by picking up the symbol(s) filled in the storage cell(s) of the corresponding one of the groups; and generating, by the processing system, a secure alternative representation for the first sequence by concatenating the composed queue for each of the groups.

21 Claims, 16 Drawing Sheets

(51) Int. Cl.
*G06F 21/31* (2013.01)
*G06F 21/60* (2013.01)
*G06F 16/438* (2019.01)
*G06F 7/58* (2006.01)

(52) U.S. Cl.
CPC ........ *G06F 21/602* (2013.01); *G06F 21/6227* (2013.01); *G06F 7/588* (2013.01)

(56) References Cited

U.S. PATENT DOCUMENTS

| | | | |
|---|---|---|---|
| 8,726,398 | B1 | 5/2014 | Tock et al. |
| 8,812,867 | B2 | 8/2014 | Jho et al. |
| 9,774,578 | B1* | 9/2017 | Ateniese ................. H04L 9/085 |
| 10,200,196 | B1* | 2/2019 | Rodriguez De Castro ................. H04L 9/0836 |
| 2009/0113213 | A1 | 4/2009 | Park et al. |
| 2010/0042846 | A1 | 2/2010 | Trotter et al. |
| 2014/0129567 | A1 | 5/2014 | Araki et al. |
| 2014/0143549 | A1 | 5/2014 | Araki et al. |
| 2014/0331044 | A1* | 11/2014 | Fujii ................. G06F 16/90335 713/165 |
| 2016/0140179 | A1* | 5/2016 | Yuen ................... G06F 16/2272 707/769 |
| 2016/0366113 | A1 | 12/2016 | Dawoud |
| 2017/0078251 | A1 | 3/2017 | Grubbs |
| 2017/0099262 | A1 | 4/2017 | Kerschbaum |

FOREIGN PATENT DOCUMENTS

| | | |
|---|---|---|
| CN | 105681280 A | 6/2016 |
| CN | 104731860 B | 11/2017 |
| CN | 107426075 A | 12/2017 |
| EP | 1939785 A2 | 7/2008 |
| TW | 333630 B | 6/1998 |
| TW | I381696 B | 1/2013 |
| TW | 201411393 A | 3/2014 |
| TW | 201426684 A | 7/2014 |
| TW | 201830283 A | 8/2018 |
| WO | WO 2017/139761 A1 | 8/2017 |

OTHER PUBLICATIONS

Reza Curtmola et al., "Searchable Symmetric Encryption: Improved Definitions and Efficient Constructions", 13th ACM conference on Computer and communications security Oct. 30, 2006, pp. 1-33, https://eprint.iacr.org/2006/210.

Wai Kit Wong et al., "Secure kNN Computation on Encrypted Databases", SIGMOD '09: Proceedings of the 2009 ACM SIGMOD International Conference on Management of data, Jun. 2009, ACM, pp. 1-14.

Dongsheng Wang et al., "Generalized Pattern Matching String Search on Encrypted Data in Cloud Systems", 2015 IEEE Conference on Computer Communications (INFOCOM), Apr. 26, 2015, pp. 2101-2109.

Gu Chunsheng et al., "Known-plaintext attack on secure kNN computation on encrypted databases", Security and Communication Networks; 7:2432-2441, Jan. 17, 2014, pp. 2432-2441, wileyonlinelibrary.com, Security Comm. Networks 2014.

Amir Rezapour et al., "Efficient Common Prefix Search on Encrypted Data as an Additional Service on the Top of the Storage Providers", 2015 IEEE International Conference on Smart City/SocialCom/SustainCom (SmartCity), 2015, pp. 975-981.

Dawn Xiaodong Song et al., "Practical Techniques for Searches on Encrypted Data", Proceeding 2000 IEEE Symposium on Security and Privacy, S&P 2000, May 14, 2000, pp. 44-55.

Boldyreva et al., "Order-Preserving Symmetric Encryption," Advances in Cryptology —EUROCRYPT 2009, $28^{th}$ Annual International Cryptology Conference, 2009, pp. 1-28.

Hore et al., "A Privacy-Preserving Index for Range Queries," Proceedings of the $30^{th}$ VLDB Conference, 2004, pp. 720-731.

Hacigumus et al., "Executing SQL over Encrypted Data in the Database-Service-Provider Model," ACM SIGMOD, Jun. 4-6 2002, 12 pages.

Agrawal et al., "Order Preserving Encryption for Numeric Data," SIGMOD, Jun. 13-18, 2004, 12 pages.

Fan et al., "Prefix-preserving IP address anonymization: measurement-based security evaluation and a new cyrptography-based scheme," Computer Networks 46, 2004, pp. 253-272.

Li et al., "Fast and Scalable Range Query Processing with Strong Privacy Protection for Cloud Computing," IEEE/ACM Transactions on Networking, vol. 24, No. 4, Aug. 2016, pp. 2305=2318.

Eu-Jin Goh; "Secure Indexes"; International Association for Cryptologic Research; vol. 20040316:200136, Mar. 16, 2004; pp. 1-18; XP061000695.

TIPO Office Action issued in corresponding Chinese Application No. 108109642 dated Apr. 24, 2020.

\* cited by examiner

METHOD, COMPUTER PROGRAM PRODUCT AND PROCESSING SYSTEM FOR GENERATING SECURE ALTERNATIVE REPRESENTATION

TECHNICAL FIELD

The application relates to a method, a computer program product and a processing system for generating secure alternative representations.

BACKGROUND

Cloud applications are around those who connect themselves to the cyberspace, when search engines have already become inevitable tools and cloud storage services also have been attracting a vast number of users experiencing extraordinary mobility, scalability and availability for free. However, users do pay for these benefits, no matter they realize it or not, in term of their privacy.

Being aware of possible infringements made by hackers or service providers, users are increasingly demanding their privacy. In order to avoid personal information leakage, data are suggested to be encrypted before being stored in one or more corresponding servers in cloud. Nevertheless, encrypted data may make the searching for particular data hard, if not impossible, resulting in inconvenience during searching and/or retrieving data upon the server(s). Based on the above considerations, how to provide a secure and still easy-to-search data retrieval mechanism is one of the subjects of industry efforts.

SUMMARY

An exemplary embodiment of a method, in a processing system comprising one or more processing units and one or more storage units, for generating secure alternative representation is disclosed. The method comprising: providing, by the processing system, a first sequence comprising a plurality of first values; providing, by the processing system, a plurality of storage cells belonging to a plurality of groups, each of the groups having one or more storage cells; performing, by the processing system, for each of the storage cells a symbol-deriving and cell-filling procedure; composing, by the processing system, a queue for each of the groups by picking up the symbol or symbols filled in the one or more storage cells of the corresponding one of the groups; and generating, by the processing system, a secure alternative representation for the first sequence by concatenating the composed queue of each of the groups. The said symbol-deriving and cell-filling procedure further comprises, for each of the storage cells: deriving, by the processing system, one or more secret pointers, each of the secret pointers pointing to one of the first values; forming, by the processing system, a token by putting together one or more of the first values which are pointed by the corresponding secret pointers; mapping, by the processing system, the token into a symbol; and filling, by the processing system, the symbol into the corresponding one of the storage cells.

An exemplary embodiment of a computer program product comprising a non-transitory computer readable medium having a computer readable program stored therein is disclosed. The computer readable program, when executed on a processing system, causes the processing system to: provide a first sequence comprising a plurality of first values; provide a plurality of storage cells belonging to a plurality of groups, each of the groups having one or more storage cells; perform, for each of the storage cells, a symbol-deriving and cell-filling procedure; compose a queue for each of the groups by picking up the symbol or symbols filled in the one or more storage cells of the corresponding one of the groups; and generate a secure alternative representation for the first sequence by concatenating the composed queue of each of the groups. The computer readable program, when executed on a processing system during the symbol-deriving and cell-filling procedure for each of the storage cells, further causes the processing system to: derive one or more secret pointers, each of the secret pointers pointing to one of the first values; form a token by putting together one or more of the first values which are pointed by the corresponding one of the secret pointers; map the token into a symbol; and fill the symbol into the corresponding one of the storage cells.

An exemplary embodiment of a processing system for generating secure alternative representation is disclosed. The processing system comprises one or more processing units and one or more storage units coupled to the one or more processing units. The one or more storage units comprises instructions which, when executed by the one or more processing units, cause the one or more processing units to: provide a first sequence comprising a plurality of first values; provide a plurality of storage cells belonging to a plurality of groups, each of the groups having one or more storage cells; perform, for each of the storage cells, a symbol-deriving and cell-filling procedure; compose a queue for each of the groups by picking up the symbol or symbols filled in the one or more storage cells of the corresponding one of the groups; and generate a secure alternative representation for the first sequence by concatenating the composed queue of each of the groups. The instructions when executed by the one or more processing units during the symbol-deriving and cell-filling procedure for each of the storage cells, further cause the one or more processing units to: derive one or more secret pointers, each of the secret pointers pointing to one of the first values; form a token by putting together one or more of the first values which are pointed by the corresponding one of the secret pointers; map the token into a symbol; and fill the symbol into the corresponding one of the storage cells.

The above and other aspects of the application will become better understood with regard to the following detailed description of the embodiment(s) be described. The following description is made with reference to the accompanying drawings.

DETAILED DESCRIPTION

Figure 1:
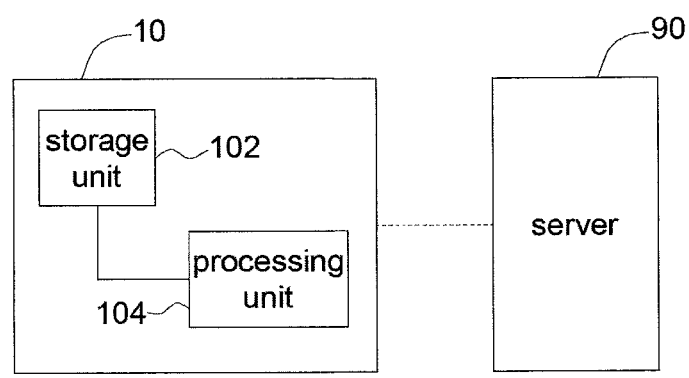
FIG. 1 shows a block diagram of a processing system according to an embodiment of the present application.

Referring to FIG. 1, FIG. 1 shows a block diagram of a processing system for generating secure alternative representations according to an embodiment of the present application. The processing system 10 includes one (or more) storage unit 102 and one (or more) processing unit 104. The storage unit 102 is configured to store data, applications, procedures, computer readable instructions or computer readable programs which are configured for generating secure alternative representations. The processing unit 104 is configured to execute the applications, the procedures, the computer readable instructions or the computer readable programs to perform the method for generating secure alternative representation. In some embodiments, a computer program product comprising a non-transitory computer readable medium may be employed to store applications, procedures, computer readable instructions or computer readable programs. When the applications, the procedures, the computer readable instructions or the computer readable programs is/are executed on the processing system 10, it causes the processing system 10 to perform the method for generating secure alternative representations.

In the present application, one or more secure alternative representations can be generated for a first sequence comprising a plurality of first values. In an embodiment, the first sequence is a descriptor to a first data which is considered as private or confidential in object of file(s), sentence(s) or even a single word. The data owner (user) may expect to hide the first data before storing the first data into a remote storage space in a server 90. In this situation, before storing the first data into a remote storage space in a server 90, the method according to the present application is able to generate one or more secure alternative representations used as a secure index or secure indexes representing the first sequence (or the first data) while hiding its actual content, leaving the first data be independently encrypted. In another embodiment, when the data owner (user) needs to identify the previous generated secure index or secure indexes stored in the remote storage space and/or wants to retrieve the associated encrypted first data, the first sequence may be used as a query-word, and the method according to the present application may be used to generate one or more secure alternative representations used as a secure trapdoor or secure trapdoors to identify the secure index or secure indexes.

In this application, said secure alternative representations may be used as hash tags, like MD5 or HMAC, for the first data. And beyond hash tags, said secure alternative representations are generated for the first sequence as secure indexes or secure trapdoors such that each of the secure trapdoors can identify a corresponding secure index or secure indexes without revealing the actual content of the first sequence and thus the first data. This corresponds to a data retrieval mechanism enabled by the method which generates one or more secure indexes for each of private or confidential objects, such as files and words, before doing encryption over the objects in user-side; after uploading the encrypted object and the secure index or the secure indexes to a server, one can retrieve one or more encrypted objects from the server if one or more trapdoors could be provided as a clue to identify the associated secure index(es). To each of the private or confidential objects, the corresponding secure index can be seen as a secure alternative representation which securely hides the actual content of the object but nevertheless represents it, in a way analogous to hash tags such as MD5 and HMAC. Similarly, to identify one or more secure indexes generated for each of the private and confidential objects, the one or more trapdoors can be seen as another secure alternative representation to the object(s), and the trapdoors are too expectedly hide the actual content of the object(s) as this application reveals.

The processing system 10 may be implemented by a cellphone, a personal computer, a notebook, a smart phone, a tablet, and so on. For example, the processing system 10 is able to be connected to a server 90, and send the generated secure indexes to the server 90 and thus store the secure indexes in the server 90. Also, the processing system 10 may send secure trapdoor(s) to the server 90 to search desired index(es) among the secure indexes stored in the server 90.

In the embodiment, since the first sequence is transformed into a secure index which is used, for example, instead of the first sequence to store into the server 90, the server 90 cannot observe the actual content of the first sequence from the secure index. Similarly, when searching, since the first sequence which is used as query-word is transformed into a secure trapdoor which is used, for example, instead of the first sequence, the server 90 may be difficult to observe the actual content of the first sequence from the secure trapdoor either.

Details of the method may be described with FIG. 2 below. Note that, since there are some differences in detail between generating secure index and generating secure trapdoor by using the method shown in FIG. 2, an embodiment of generating secure index by using the method may be illustrated firstly, and another embodiment of generating secure trapdoor by using the method may be illustrated secondly. Additionally, in order to make the description clearer, when illustrating embodiments of generating secure index, the elements e.g., group, storage cell, secret pointer, token, symbol and queue, may be labelled with an "index"

in front thereof, such as index group, index storage cell, index secret pointer, index token, index symbol and index queue. Also, when illustrating embodiments of generating secure trapdoor, the elements e.g., group, storage cell, secret pointer, token, symbol and queue, may be labelled with a "trapdoor" in front thereof, such as trapdoor group, trapdoor storage cell, trapdoor secret pointer, trapdoor token, trapdoor symbol and trapdoor queue.

Figure 2:
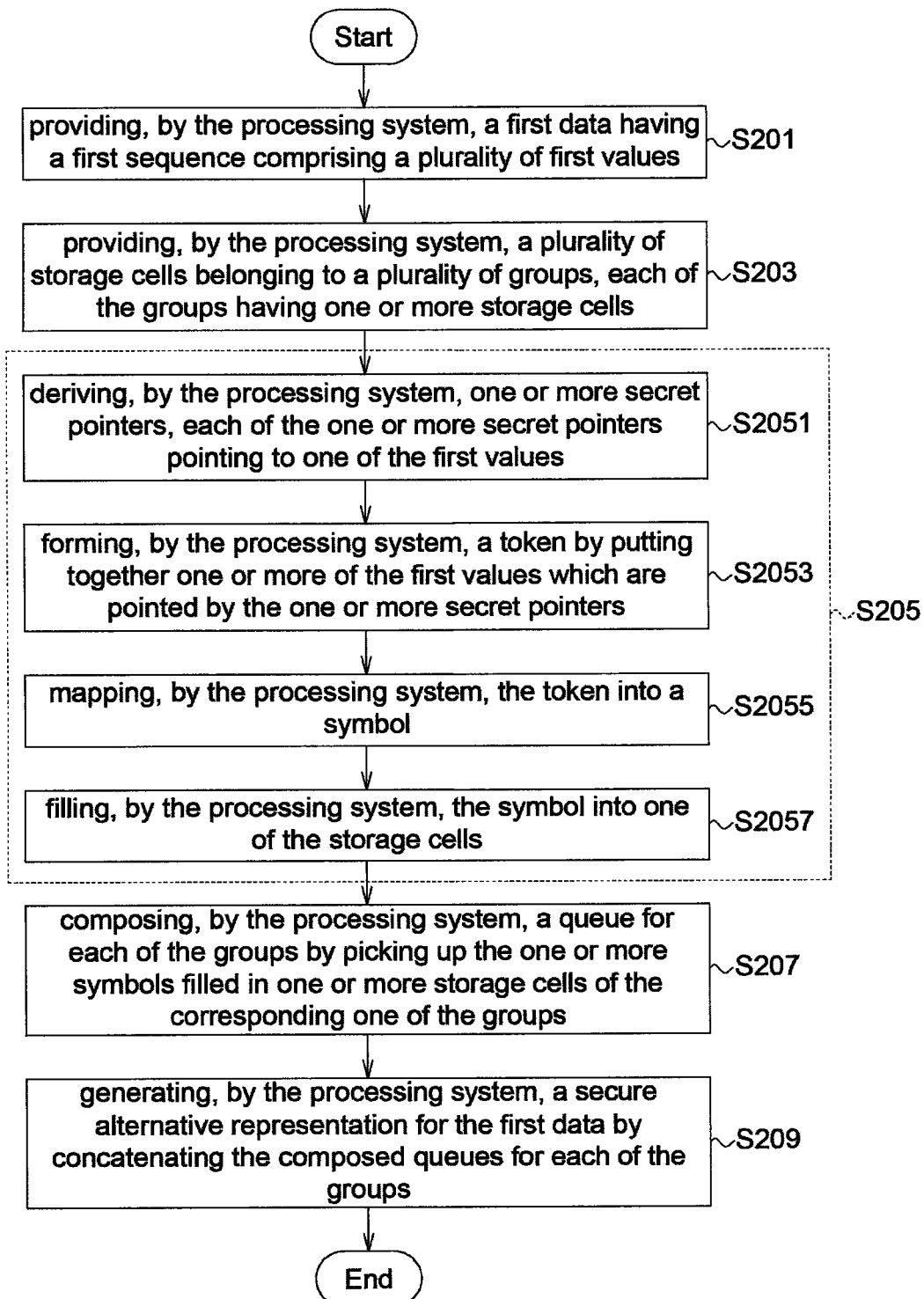
FIG. 2 shows a flowchart of a method for generating secure alternative representation according to an embodiment of the present application.
Figure 3:
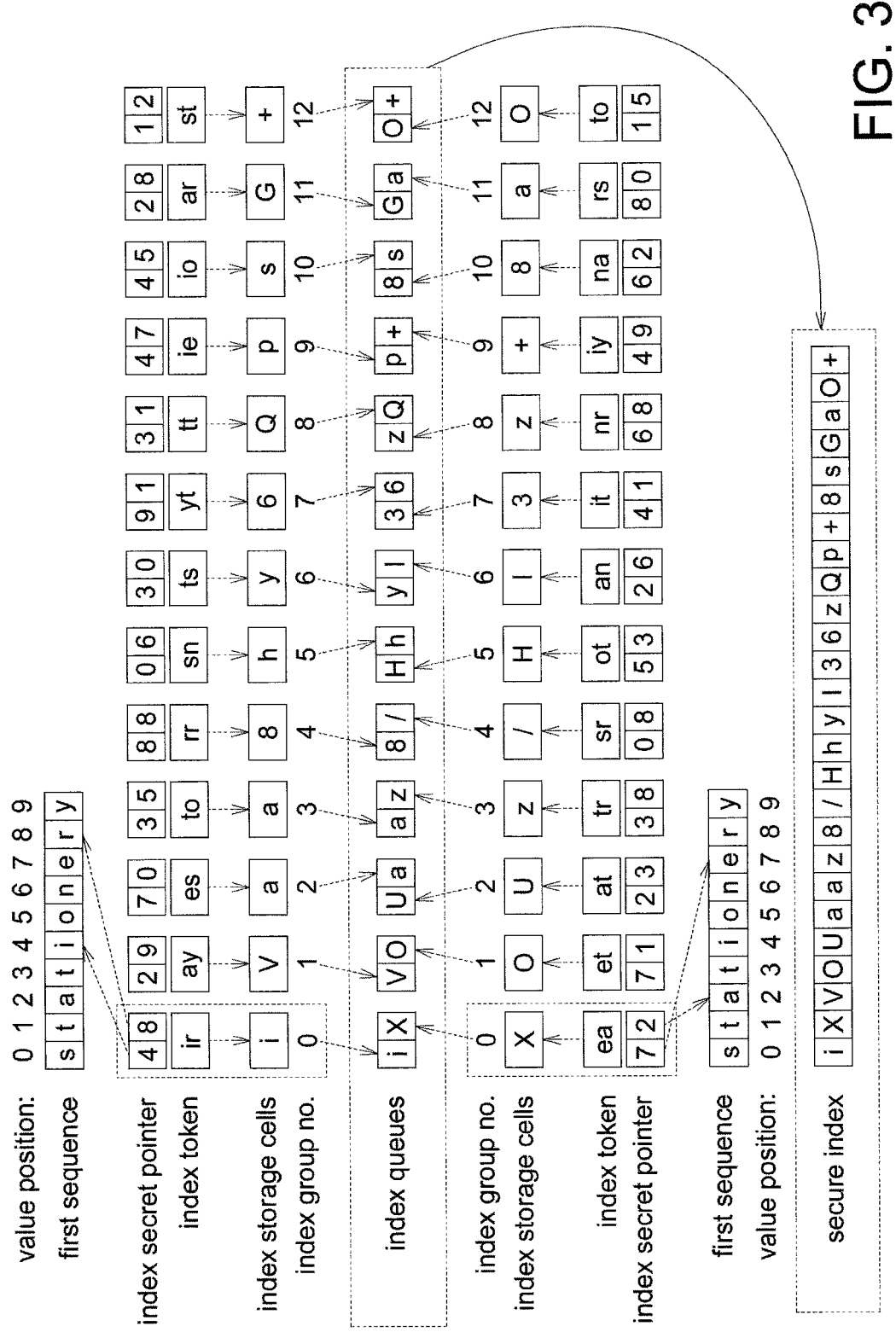
FIG. 3 shows a diagram illustrating the first example of generating secure index according to an embodiment of the present application.

Referring to FIG. 2 and FIG. 3, the method in FIG. 2 includes steps S201~S209. In this embodiment, the method shown in FIG. 2 is used for generating secure alternative representation which may be used as a secure index.

In step S201, providing a first sequence including a number of first values is performed by the processing system 10. For example, the first sequence may be a descriptor to a first data which may be a document or a 1-dimension data. The first values may be either of a plurality of character encodings for representing textual data, or of a plurality of numerical values for representing numerical data. However, in some embodiments, such as the first embodiment shown in FIG. 3, the first values are of characters but regarded as values with a value position addressing each of the first values. This is not unusual as characters maybe encoded as digital values in some electronic device or computers, so characters are indeed values. In the first example, as shown in FIG. 3, it is assumed that the first sequence is "stationery" which includes characters.

In step S203, providing a plurality of storage cells belonging to a plurality of groups, each of the groups having one or more storage cells is performed by the processing system 10. The quantity of the index storage cell(s) of each of the groups may be either the same or different. For instance, in one embodiment, some index groups include one index storage cell, and some other index groups include two or more index storage cells. That is, the number of index storage cells for each of index groups may be different with each other. In another embodiment, each index group includes three index storage cells, so that the number of index storage cells for each of index groups may be the same but the present disclosure is not limited thereto. Merely for the purpose of illustration, in the first example shown in FIG. 3, it is assumed that the index storage cells belong to thirteen index groups 0~12, and each of the index groups includes two index storage cells.

In step S205, performing for each of the storage cells a symbol-deriving and cell-filling procedure is performed by the processing system 10. The symbol-deriving and cell-filling procedure includes steps S2051~S2057 for each of the storage cells.

In step S2051, deriving one or more secret pointers, each of the one or more secret pointers pointing to one of the first values is performed by the processing system 10. The quantity of the index secret pointer(s) for each of the index storage cells is either the same or different between the index storage cells and the index secret pointers are derived from a secret source such as at least one of the followings: a piece of memory pre-filled with values, an algorithm outputs values from inputs of at least one of the followings: a secret key, a secret phrase, an user identification, a location identification and a time identification. However, merely for the purpose of illustration, in the first example, it is assumed that the quantity of the index secret pointers for each of the index storage cells is predetermined to be the same, and equals to two. For example, in the upper index storage cell of the index group 0 in the first example, the index secret pointers point to value positions "4" and "8" respectively.

In step S2053, forming a token by putting together one or more of the first values which are pointed by the one or more secret pointers is performed by the processing system 10. For example, in the upper index storage cell of the index group 0 in the first example, the corresponding index token "ir" is formed by putting together "i" and "r" among the first values of the first sequence since "i" is pointed by the index secret pointer "4" and "r" is pointed by the index secret pointer "8".

In step S2055, mapping the token into a symbol is performed by the processing system 10. For example, in the upper index storage cell of the index group 0 in the first example, the corresponding index token "ir" is mapped to an index symbol "i". However, it should be clear for those skilled in the art that, the symbol is a value which, in this example, is represented by one character for the purpose of illustration but the present disclosure is not limited to the number of characters for representing a particular symbol, so that a symbol is a value which may be represented by one or more characters.

The process of mapping-token-into-symbol may be performed by a deterministic function, i.e. tokens are always mapped into the same symbol if the tokens are the same. Such a process can be implemented by, but not limited to, a look-up table, a value-mapping algorithm, a secure hashing algorithm (SHA), a keyed-hash message authentication code (HMAC), an encryption algorithm, Order-Preserving Encryption (OPE), or a combination thereof. For example, in first example shown in FIG. 3, a function which maps a token of two base64 characters into a symbol of one base64 character is used.

In step S2057, filling the symbol into one of the storage cells is performed by the processing system 10. For example, in the upper index storage cell of the index group 0 in the first example, the upper index storage cell of the index group 0 is filled with the index symbol "i". Other index storage cells may be filled through the same process describe above.

In step S207, composing a queue for each of the groups by picking up the one or more symbol filled in the one or more storage cells of the corresponding one of the groups is performed by the processing system 10. In one embodiment, the index queue for each of the index groups is formed by picking up all of the index symbols stored in the index storage cells of the corresponding index group. In one embodiment, the step of picking up is performed according to a random sequence which determines the order of the index symbols to be placed in the index queue, and the random sequence is generated by feeding a pseudo random generation algorithm with at least one of the followings: a seed, a secret key, a secret phrase, an user identification, a location identification and a time identification.

In the first example, as shown in FIG. 3, for the index group 0, the index symbol "i" in the upper index storage cell is randomly determined as the first pick, and the index symbol "X" in the lower index storage cell is the second pick, so that an index queue containing "iX" is formed; for the index group 1, the index symbol "V" in the upper index storage cell is randomly determined as the first pick, and the index symbol "O" in the lower storage cell is then the second pick, so that the index queue containing "VO" is formed. Other index queues are generated in similar way.

In step S209, generating a secure alternative representation for the first sequence by concatenating the composed queues for each of the groups is performed by the processing system 10. In one embodiment, the secure alternative representation is generated based on the index queues of all of the index groups. In one embodiment, step S209 is performed by concatenating the index queues, where the concatenating is performed according to random sequence which determines the concatenating order of the composed queue of each of the groups, and the random sequence is generated by feeding a pseudo random generation algorithm with at least one of the followings: a seed, a secret key, a secret phrase, an user identification, a location identification and a time identification. However, merely for the purpose of a clear illustration, in this example shown in FIG. 3, the index queues are concatenating orderly from index queue of the index group 0 to index queue of the index group 12.

The generated secure alternative representation is used as a secure index for the first data. In the first example shown in FIG. 3, the generated secure index is "iXVOUaaz8/Hhyl36zQp+8sGaO+".

Merely for the purpose of a clear illustration, in the example of FIG. 3, each of the index groups has two index storage cells, and two index secret pointers are generated for each of the index storage cells. Therefore, each of the index tokens is formed by two of the first values pointed by the two index secret pointers of one of the corresponding index storage cells. The index queue for each of the index groups is formed by picking up all of the index symbols stored in the index storage cells of the corresponding index group. However, the disclosure is not limited thereof.

It should be noted that each of the first values of the first sequence, though being represented by a character, corresponds to a specific value, and so does each of the symbols. However, the encoding used of the characters and the symbols, which maps the specific value to each of the characters or each of the symbol, may be the same or different. For example, in one embodiment, the characters are of English alphabets encoded in ASCII codes while the symbols are of base64 encodings. In another embodiment, the characters are of base64 encodings while the symbols are of English alphabets encoded in ASCII codes. In still another embodiment, the characters are encoded in UTF8 alphabets while the symbols are encoded in base64 alphabets, while in yet another embodiment, the characters and symbols are encoded according to the same standard, such as base64 encodings. Therefore, according to the requirement of different applications, any pair of alphabet encoding sets for characters and symbols is applicable and achieving the desired effects of the disclosure. That is, the generated secure index can hide the first sequence.

Additionally, the example in FIG. 3 is an example of using an open standard algorithm to map tokens to symbols. In FIG. 3, though not illustrated explicitly, an HMAC is used for the process of mapping-token-into-symbol. By using a HMAC, the length of the index token may be variable but the output of the HMAC is of fixed length, e.g., 32-bytes. However, such outputs are sometime considered too long for some applications to be used directly as an index symbol, as long index symbols result in long indexes prohibited by some applications or systems. Merely for illustrating such a practical concern, in this exemplary embodiment, only a part of the output, e.g., 1 character represented in base64, is extracted to be the index symbol and the disclosure is not limited thereto.

Nevertheless, instead of extracting, to produce symbols of desired shorter length, merging the bytes of long outputs of the mapping can be adopted in some embodiments. For example, algorithms such as Cyclic Redundancy Check (CRC), checksum, modulo, or the like is also able to be used. It is known that both the process of the said extracting and merging often results in a many-to-one function which has additional benefits as revealed below.

In some embodiments, the process of mapping-token-into-symbol is performed by a many-to-one function. Under such configurations, an index symbol is probably mapped from a number of different index tokens. Such a mapping makes the generation irreversible because many-to-one function is irreversible, and thus makes the secure index even securer. However, the tokens are still concealed in some embodiments even if the process of mapping-token-into-symbol is performed by a bijection function or an injection function, as long as the function of "mapping-token-to-symbol" is not revealed to adversaries. Without knowing the actual index token, the generation is still irreversible, not yet mentioning to the situation when the index secret pointers are kept secret. Therefore, the property, hiding the first values of the first sequence, is met.

Figure 4:
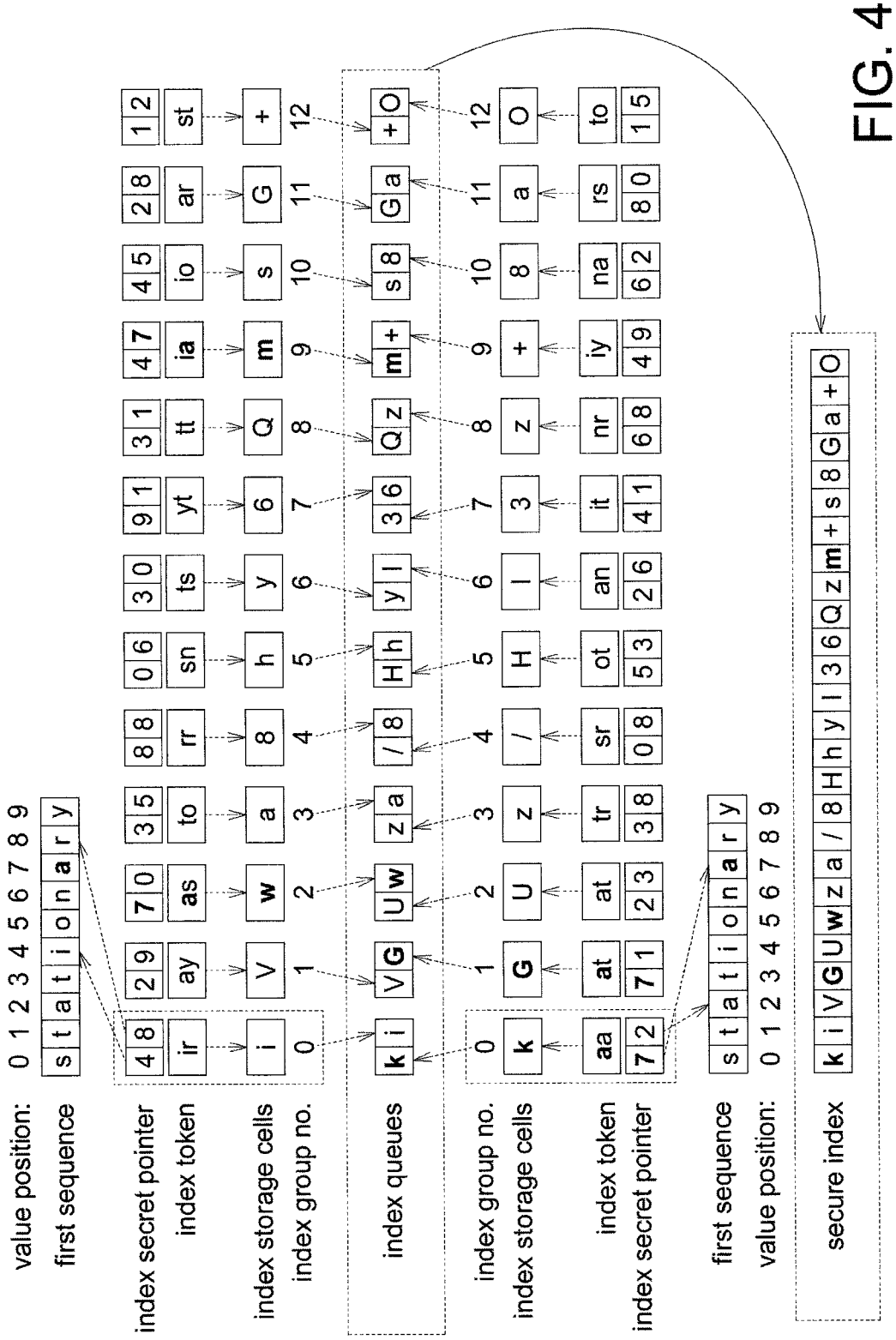
FIG. 4 shows a diagram illustrating the second example of generating secure index according to an embodiment of the present application.

Referring to FIG. 4, FIG. 4 shows a second example illustrating another example for generating secure index. As shown in FIG. 4, the first sequence is assumed to "stationary" which is slightly different from "stationery" in the first example shown in FIG. 3. By using the method shown in FIG. 2, the outputted secure index is "kiVGUwza/8Hhyl36Qzm+s8Ga+O". Comparing with the generated secure index shown in FIG. 3 (i.e., "iXVOUaaz8/Hhyl36zQp+8sGaO+"), what can be observed is that a slightly difference between the input first sequences may result in enlarged difference between the outputted secure indexes.

Figure 5:
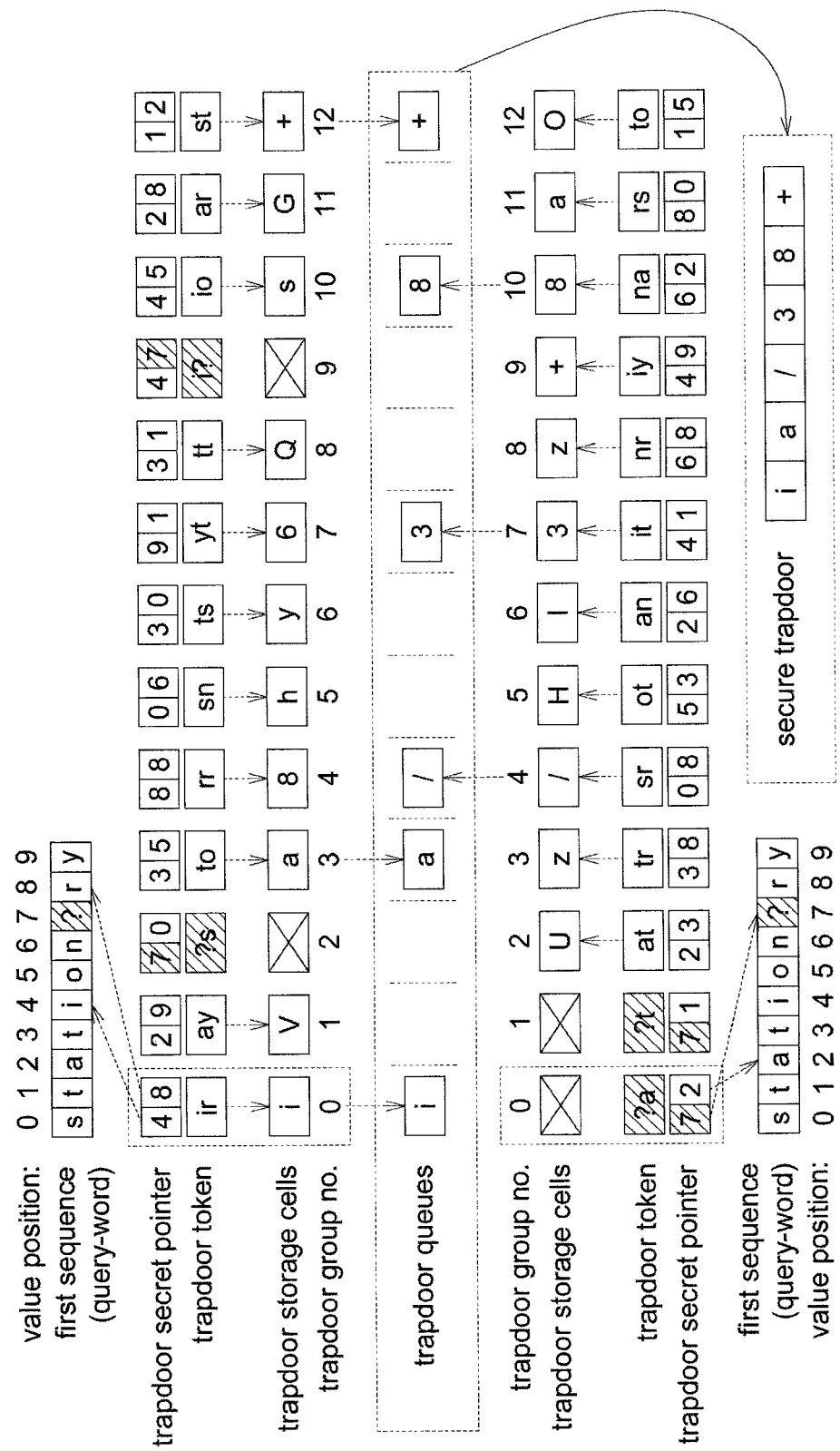
FIG. 5 shows a diagram illustrating the third example of generating secure trapdoor according to an embodiment of the present application.

Referring to FIG. 2 again, and also referring to FIG. 5, an embodiment of generating alternative representation which is used as a secure trapdoor by using the method shown in FIG. 2 may be illustrated below. To be noted, in the embodiments of generating the secure trapdoor, the first sequence may be used as a query-word. Therefore, to clarify the description, in the embodiments of generating the secure trapdoor, description of "first sequence" may be replaced with description of "query-word" since these two descriptions are equivalent in this case.

Being used as query-word, in step S201, the first values of the first sequence may be allowed to contain one or more wildcards representing any values. In some embodiments, the wildcard may represent one arbitrary value. In the third example as shown in FIG. 5, it is assumed that the query-word is "station?ry", where "?" is a wildcard for the example. Note that the character representing a wildcard may be implementation dependent. In SQL, the character "_" may be used instead of "?" for representing an arbitrary character. Also note that, in some other embodiments, another kind of wildcard such as "*" or "%" which may represent zero, one, or multiple arbitrary characters is used in query-word. Such a query-word can be described by a number of query-words containing an increasing number of wildcards representing one arbitrary value. For example, given a query-word "station*y" contains a wildcard "*" which represents zero, one, or multiple arbitrary characters, the query-words "stationy", "station?y", "station??y" and so on can describe what the query-word "station*y" intends for. Therefore, supporting the wildcard representing an arbitrary character is sufficient in this sense.

When generating secure trapdoor, details of the steps S203, S2051 and S2053 are similar to those for generating secure index.

In step S2055, since the query-word may include one or more wildcards, i.e. "?", some of the trapdoor tokens may comprise of wildcard, e.g. in the third example, the trapdoor token corresponds to each of the one or more trapdoor storage cells which has at least one trapdoor secret pointer pointing to the value position 7. In such a case, the trapdoor token containing a wildcard may not be able to map into a trapdoor symbol, and the corresponding trapdoor symbol may be regarded as not available (N/A) or not existing.

In step S2057, as mentioned above, in such a case that the trapdoor token including a wildcard, the corresponding trapdoor symbol is regarded as not existing, so that the corresponding trapdoor storage cell may not be filled. For example, as shown in FIG. 5, the upper trapdoor storage cells of the trapdoor groups 2 and 9 and the lower trapdoor storage cells of the trapdoor groups 0 and 1 are not filled.

That is, in this embodiment, when the corresponding formed trapdoor token contains at least one wildcard, the symbol-deriving and cell-filling procedure for a corresponding trapdoor storage cell with the corresponding formed trapdoor token containing at least one wildcard may halt.

In step S207, the trapdoor queue for each of the trapdoor groups is formed by picking up one or at most one of the trapdoor symbol stored in the trapdoor storage cell(s) of the corresponding trapdoor group when the trapdoor symbol exist is performed. The picking up may be performed randomly. For example, as shown in FIG. 5, for the trapdoor group 0, "i" is picked from the upper trapdoor storage cell; for the trapdoor groups 1 and 2, no trapdoor symbol is picked, and so forth. In this example, six trapdoor queues are formed, and each of the trapdoor queues contains one trapdoor symbol. That is, when generating a secure trapdoor, some trapdoor groups may provide no trapdoor symbol, and some other groups may provide one trapdoor symbol.

In step S209, the secure trapdoor is generated based on all of the generated trapdoor queues. For example, as shown in FIG. 5, the generated secure trapdoor "ia/38+" represents the query-word "station?ry". Obviously, the secure trapdoor "ia/38+" representing the query-word "station?ry" is a sub-sequence of the secure index "iXVOUaaz8/Hhyl36zQp+8sGaO+" representing the first sequence "stationery" and the secure index "kiVGUwza/8Hhyl36Qzm+s8Ga+O" representing the first sequence "stationary". That is, by using a string matching process, it is possible to correlate the secure trapdoor to the desired secure index(es) without showing the actual query-word to adversary or the server 90. In other words, secure indexes generated by using method shown in FIG. 2 are searchable.

Similar to the method for generating a secure index, for concerns of privacy, the configurations of the storage cells, the groups, the secret pointers, the mapping and the pseudo random generator should be kept secret. As long as the configurations are in secret, the generated secure trapdoor is a secure alternative representation for the query-word. Generally, the configurations for generating secure trapdoors should be configured the same as those for generating secure indexes in order that the generated secure indexes may be able to be searched by using the generated secure trapdoors.

The quantity of the trapdoor queues may be either predetermined or randomly-produced. In some embodiments, the quantity of the trapdoor queues is predetermined. However, in such embodiments, since the wildcard(s) existed in the query-word may result in some trapdoor tokens with no corresponding trapdoor symbol, the quantity of the formed trapdoor queue may be less than the predetermined quantity, and thus the length of some generated secure trapdoor may be shorter than other secure trapdoors. Such a difference in length can be seen as an evidence of using wildcard or not. Though such evidence cannot be used to derive the query-word, in some embodiments, the quantity of the trapdoor queues is randomly produced so as to obfuscate whether a shorter trapdoor is due to using wildcard(s) or just due to the random-produced number of the trapdoor queues.

Picking a trapdoor symbol can be performed deterministically or be performed randomly. When being performed deterministically, the same symbols are picked for the same query-word. When being performed randomly, different symbols might be picked for the same query-word. Note that, if only one secure trapdoor can be generated for a query-word, using such secure trapdoor twice gives the evidence that the query-word is used again. Though such evidence cannot be used to derive the query-word, it is sometimes considered more secure if a number of possible trapdoors can be picked for representing the query-word, so as to conceal whether the query-word is used more than once.

Figure 6:
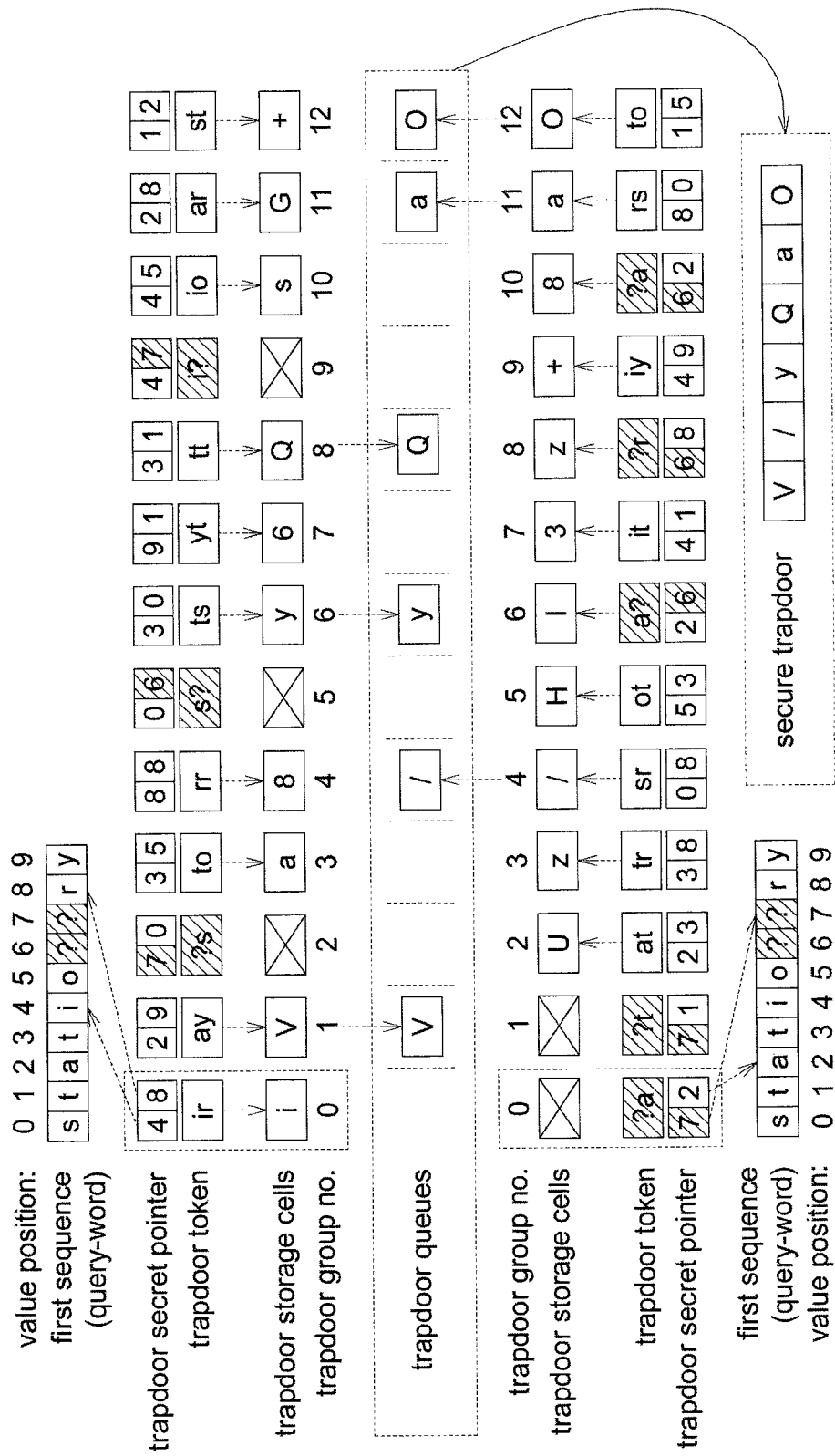
FIG. 6 shows a diagram illustrating the fourth example of generating secure trapdoor according to an embodiment of the present application.
Figure 7:
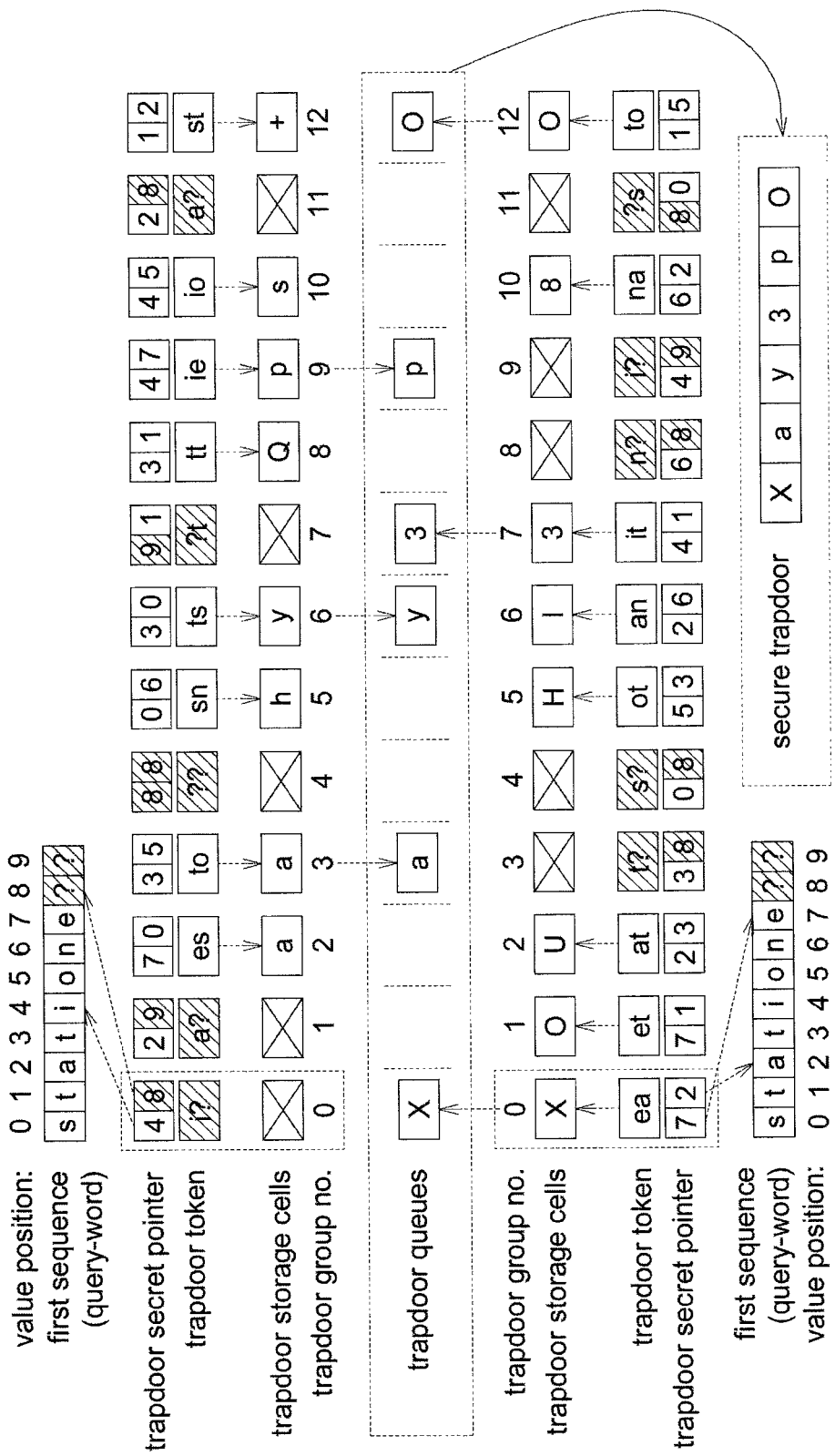
FIG. 7 shows a diagram illustrating the fifth example of generating secure trapdoor according to an embodiment of the present application.

Referring to FIGS. 6 and 7, FIGS. 6 and 7 shows fourth and fifth examples respectively illustrating the examples of generating secure trapdoors. For the purpose of illustration, the configurations used in FIGS. 5, 6 and 7 are the same as those used in FIGS. 3 and 4 in order to enable the generated trapdoors to identify one or more of the generated indexes. In the fourth example shown in FIG. 6, the query-word is "station??y", and the generated secure trapdoor is "V/yQaO". In the fifth example shown in FIG. 7, the query-word is "statione??", and the generated secure trapdoor is "Xay3pO".

Figure 8:
FIGS. 8 and 9 show diagrams illustrating examples of string match process.
Figure 9:

Referring to FIGS. 8 and 9, FIGS. 8 and 9 show diagrams illustrating examples of string match process. As shown in FIG. 8, the secure trapdoor "V/yQaO" representing the query-word "staion??y" is a sub-sequence of both the secure index "kiVGUwza/8Hhyl36Qzm+s8Ga+O" representing the first sequence "stationary" and the secure index "iXVOUaaz8/Hhyl36zQp+8sGaO+" representing the first sequence "stationery". The result is correct since both "stationery" and "stationary" can be string-matched with "station??y" in plaintext. As shown in FIG. 9, the secure trapdoor "Xay3pO" is not a sub-sequence of the secure index "kiVGUwza/8Hhyl36Qzm+s8Ga+O" representing the first sequence "stationary", but a sub-sequence of the secure index "iXVOUaaz8/Hhyl36zQp+8sGaO+" representing the first sequence "stationery". In other words, in this case, when using the query-word "statione??" for searching, only the secure index representing the first sequence "stationery" may be identified. The result is also correct since only "stationery" should be associated with "statione??". That is, as described above, the secure indexes generated may be able to be searched correctly by the generated secure trapdoors. It is possible to apply these embodiments to the server 90. For example, the actual first sequences "stationery", "stationary" and the actual query-word are only known by the user. When storing, the user stores the secure indexes rather than the corresponding first sequence in the server 90. When searching, the user sends a secure trapdoor rather than the corresponding query-word. Therefore, since the server 90 can just use secure trapdoor(s) as a clue to identify desired secure index(es), there is no need to expose the first sequence(s) to server 90 so that the privacy is kept.

Figure 10:
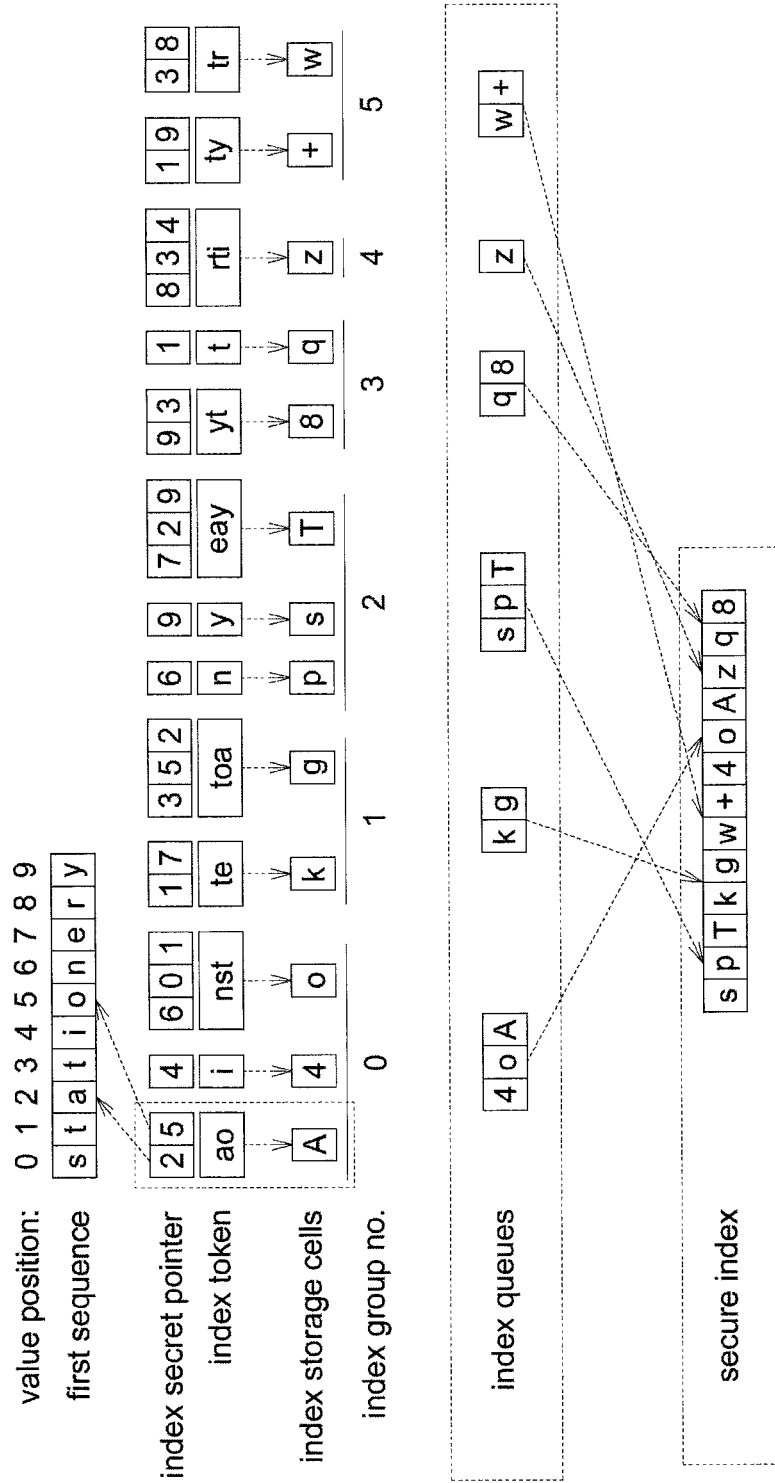
FIG. 10 shows a diagram illustrating the sixth example of generating secure index according to another embodiment of the present application.

Referring to FIG. 10, FIG. 10 shows a sixth example illustrating an example of generating secure index according to some embodiments. In the sixth example, an example of irregular configurations for generating secure index is described below. Note that, in the example, such configurations may be more general than and are different from the configurations of the first example shown in FIG. 3, but still consistent with the method according to FIG. 2.

The quantity of the index storage cells in the index groups may not be the same. For example, three index storage cells are belonging to the index group 0; two storage cells are belonging to the index group 1, and so forth. The quantity of the index secret pointers derived for filling the index storage cells may not be the same. For example, for the index group 0, for filling the first index storage cell (the left one), two index secret pointers are used; for filling the second index storage cell (the middle one), one index secret pointer is used; for filling the third index storage cell (the right one), three index secret pointers are used. After the process of the mapping-token-to-symbol, each of the index storage cells is filled with an index symbol. For each of the index groups, an index queue is composed by picking up all the index symbol(s) of the one or more index storage cells.

As shown in the sixth example in FIG. 10, the index queues may be concatenated irregularly to generate the secure index. For example, the index queue formed by the index group 2 is placed firstly; the index queue formed by the index group 1 is placed secondly, and so forth. According to the configurations, the secure index "spTkgw+4oAzq8" is generated to represent the first sequence "stationery".

Figure 11:
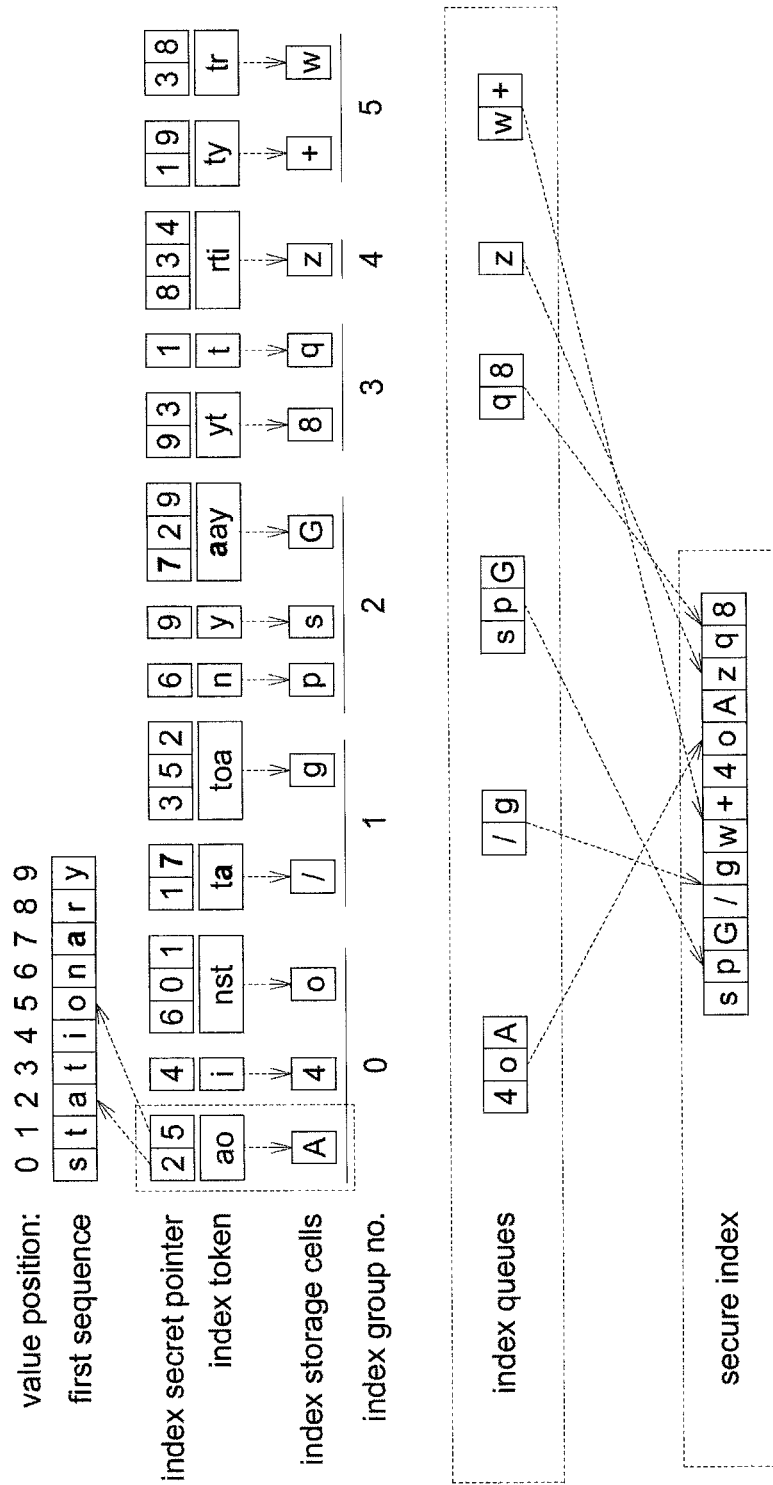
FIG. 11 shows a diagram illustrating the seventh example of generating secure index according to another embodiment of the present application.
Figure 12:
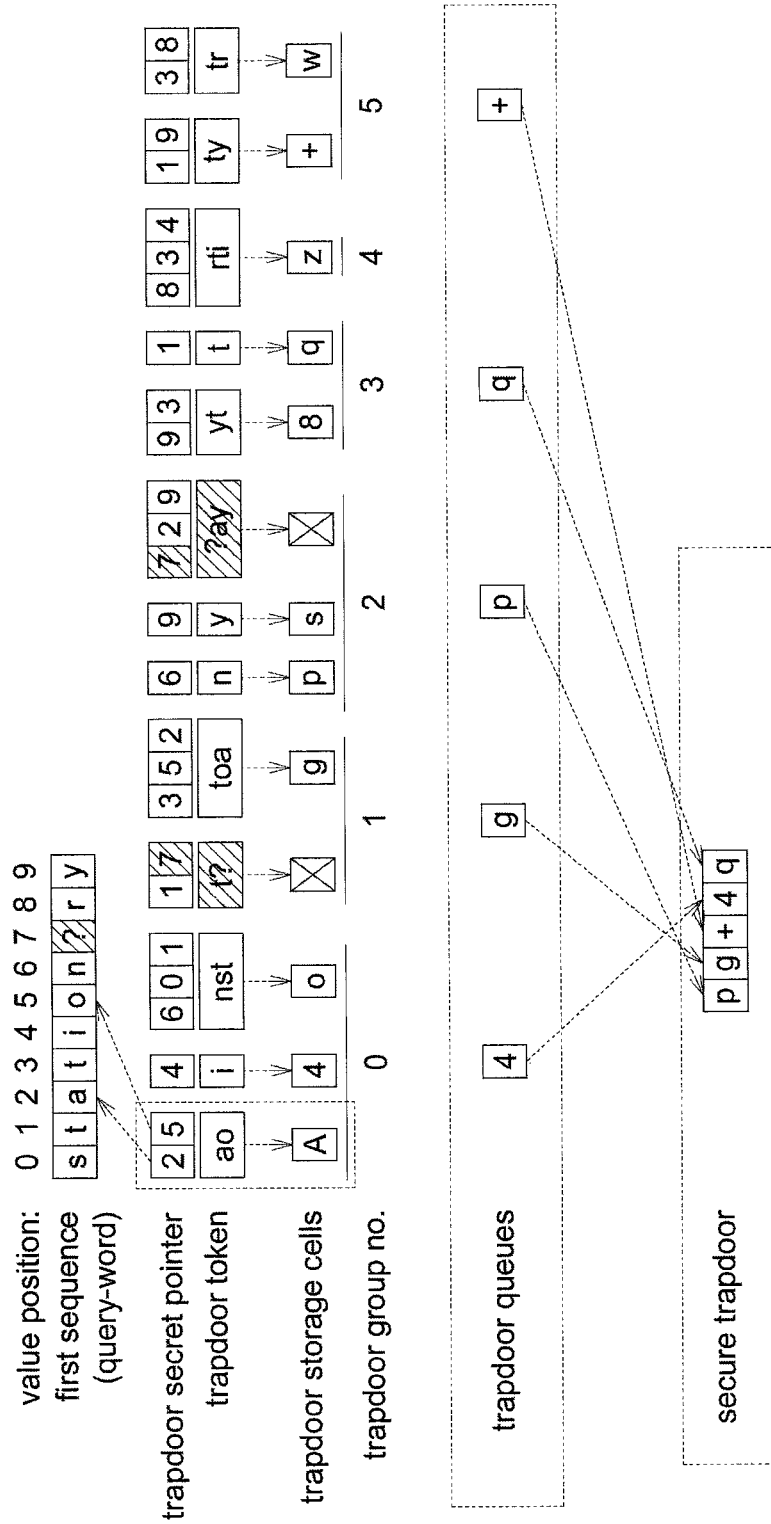
FIG. 12 shows a diagram illustrating the eighth example of generating secure trapdoor according to another embodiment of the present application.

Referring to FIG. 11, FIG. 11 shows a seventh example illustrating an example of generating secure index. The configurations used in the seventh example are same as the sixth example shown in FIG. 10. In the seventh example, the secure index "spG/gw+4oAzq8" is generated to represent the first sequence "stationary". Referring to FIG. 12, FIG. 12 shows an eighth example illustrating an example of generating secure trapdoor. The configurations used in the eighth example are same as the examples shown in FIGS. 11 and 12. In the eighth example, the secure trapdoor "pg+4q" is generated to represent the query-word "station?ry". Since the secure trapdoor "pg+4q" is a sub-sequence of both the secure index "spTkgw+4oAzq8" and the secure index "spG/gw+4oAzq8", the secure trapdoor can be correctly used to identify both of the secure indexes.

In some cases, a sequence of values used as the input first sequences could be too short so that a secure index generated for it could be identified by a short secure trapdoors if a corresponding query-word with wildcard(s). For example, if a first sequence only comprises three first values, the corresponding query-word may also need to comprise at most three first values. But, if one or more wildcards are used in the query-word, the number of trapdoor token(s) containing one or more wildcards are probably high as the corresponding secret pointers are more likely to point a wildcard within the first sequence. According to the method, this could result in a secure trapdoor of unexpectedly short length. In such cases, events of False Positive may happen during the process of index-identifying according to this disclosure. That is, one or more secure indexes might be falsely identified by the short secure trapdoor. Sometimes, such event(s) may be considered constructive under privacy concerns since such event(s) further obfuscates what to be searched.

However, considering efficiency, possible short query-words containing wildcard(s) for targeting said short sequence of value used as a first sequence might decrease the precision of the process of identifying. That is, as mentioned in preceding paragraph, if one or more wildcards are used in the query-word, the number of trapdoor token(s) containing one or more wildcards is probably high, results in a secure trapdoor of unexpectedly short length and increases False Positive events. To avoid using such a short first sequence, the said short sequence of values is treated as a second sequence, and a first sequence of longer length may be extended from the second sequence. In some embodiment, the first sequence is derived by extending the second sequence, such that the first sequence is derived according at least one of the followings: the values of the second sequence, the length of the second sequence, a secret key, a secret phrase, an user identification, a location identification and a time identification. The details may be described below.

Figure 13:
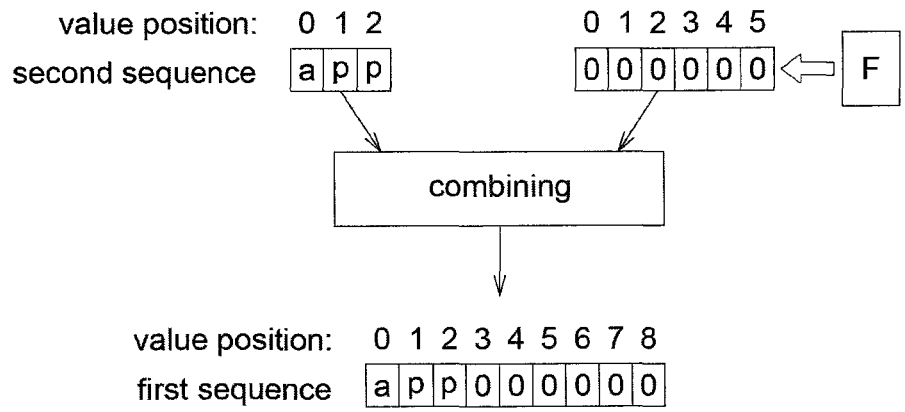
FIG. 13 shows a diagram illustrating the ninth example of sequence extending according to an embodiment of the present application.

Referring to FIG. 13, FIG. 13 shows a ninth example illustrating an example of sequence extending. In the example, the second sequence is "app", after extending, the first sequence is "app000000". That is, in the example, sequence extending is done by retaining the short sequence while appending a number of derived values represented by characters. The inserted values/characters may be derived by, in this example, a function F according to the length of the second sequence.

Figure 14:
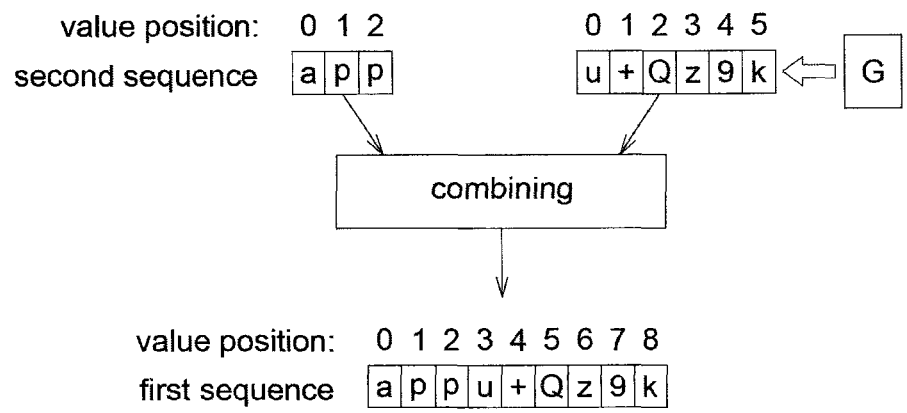
FIG. 14 shows a diagram illustrating the tenth example of sequence extending according to another embodiment of the present application.

Referring to FIG. 14, FIG. 14 shows tenth example illustrating an example of sequence extending. In the example, sequence extending is done by retaining the short sequence while appending a pseudo random sequence of values/characters rather than fixed values/characters. The pseudo random sequence of values/characters may be derived by, in this example, a function G according to the length of the second sequence.

Figure 15:
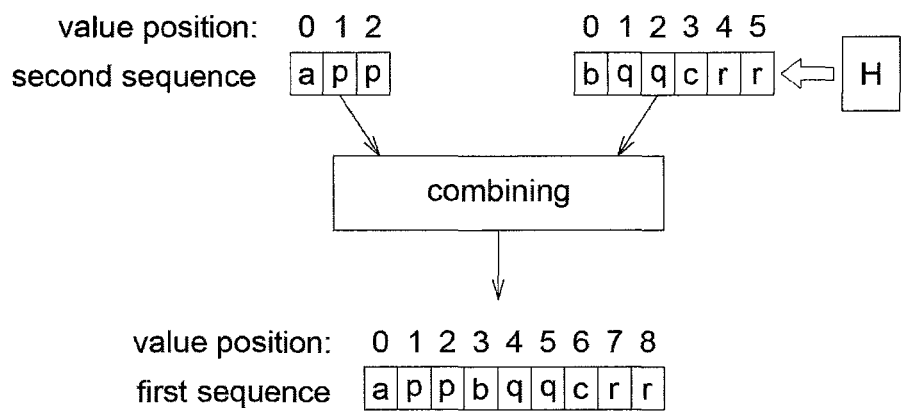
FIG. 15 shows a diagram illustrating the eleventh example of sequence extending according to another embodiment of the present application.

Referring to FIG. 15, FIG. 15 shows an eleventh example illustrating an example of sequence extending. In the example, sequence extending is done by retaining the short sequence while using a function H which derives a number of values/characters such that each of the derived value/character is derived from the value/character at a specified value/character position within the second sequence. Such a function stresses the "weight" of the specified value/character positions. If more index symbols are related with a specific value/character position within the second sequence, the value/character position has more influence on the results of index-identifying. In this example, a derived value/character at valued/character position i is derived from the value/character of the second sequence at value/character position (i mod word-length) such that the derived value/character depends on the corresponding value/character of the second sequence, wherein word-length refers to the length of the second sequence.

As a short query-word has similar properties to the short sequence, sequence extending, e.g., the mentioned functions F, G and H, may be able to be applied to a short query-word, so that a query-word may be derived from the short query-word and, if the short query-word contains one or more wildcards, each of the corresponding derived values in the query-word is also a wildcard.

Figure 16:
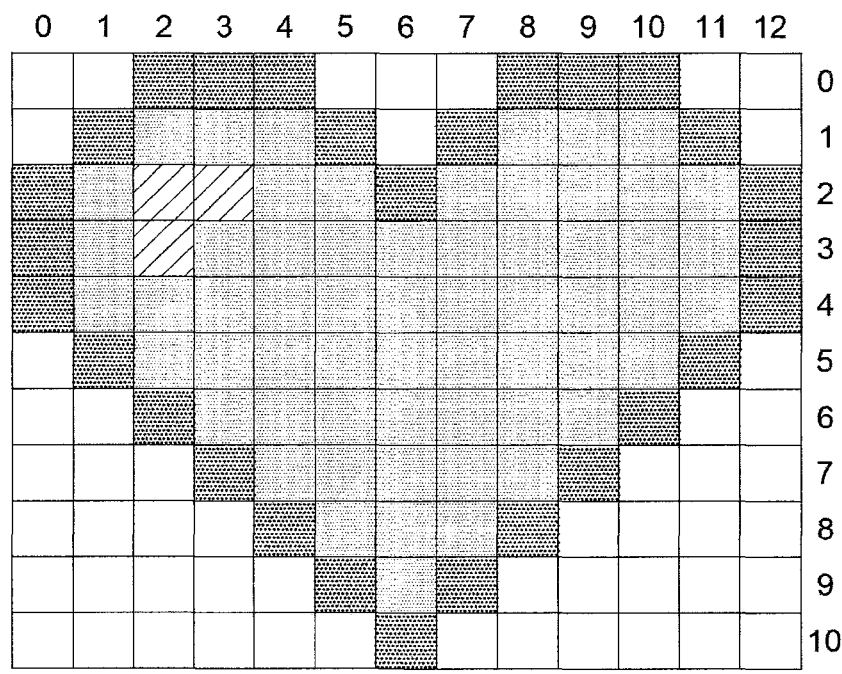
FIG. 16 shows an example of two-dimensional data.
Figure 17:
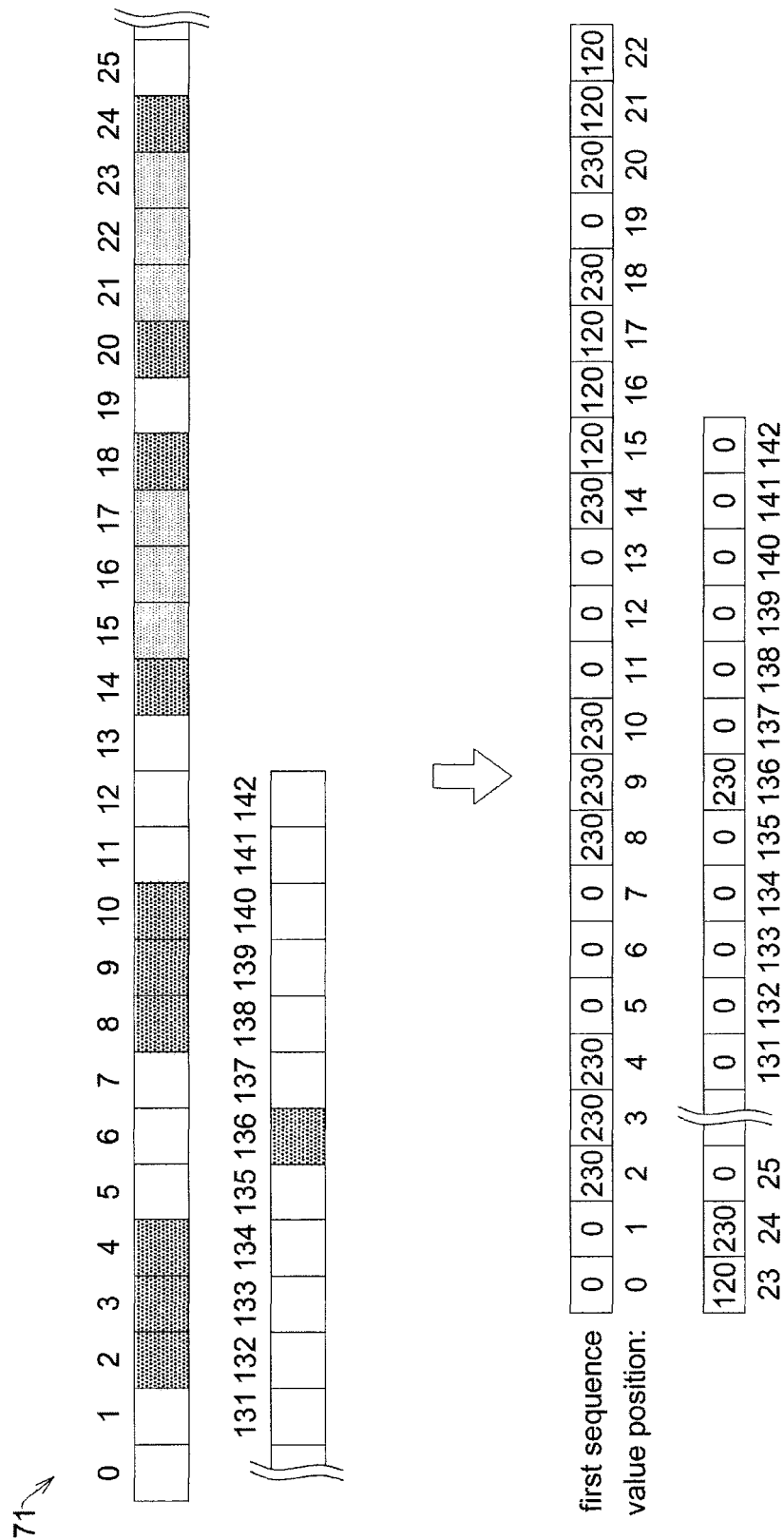
FIG. 17 shows an example of one-dimensional data transformed from the two dimension data shown in FIG. 16.

Referring to FIG. 16, FIG. 16 shows an example of two dimension data. The two dimension (2D) data 70 is an 11-by-13 gray scaled picture. It is possible to regard the 2D data 70 as a one dimension (1D) data 72 as shown in FIG. 17. For example, the 2D data 70 may be represented by a first sequence of one hundred and forty-three integer values, after a row by row serializing is performed. It is assumed that the darkest color is encoded as 230, the second darkest color is encoded as 120, the third darkest color is encoded as 50, and white color is encoded as 0. The first sequence of values [0, 0, 230, 230, . . . , 0] is represented.

According to the method, an index token is resulted by putting together one or more values pointed by the index secret pointers. In some embodiment, for examples, if an index storage cell has index secret pointers pointing to value positions 21, 14 and 135 for forming a particular index token, then the index token is a 3-tuple vector (120, 230, 0);

if another index storage cell has index secret pointers pointing to value positions 22 and 11 for forming a particular index token, then the index token is a 2-tuple vector (120, 0). According to the disclosure, one needs to derive an index symbol from the token. Such a process of mapping token into a symbol, as mentioned, may be a function embodied by a look-up table, a value-mapping algorithm, a SHA, a HMAC, an encryption algorithm, an OPE or a combination thereof.

Figure 18:
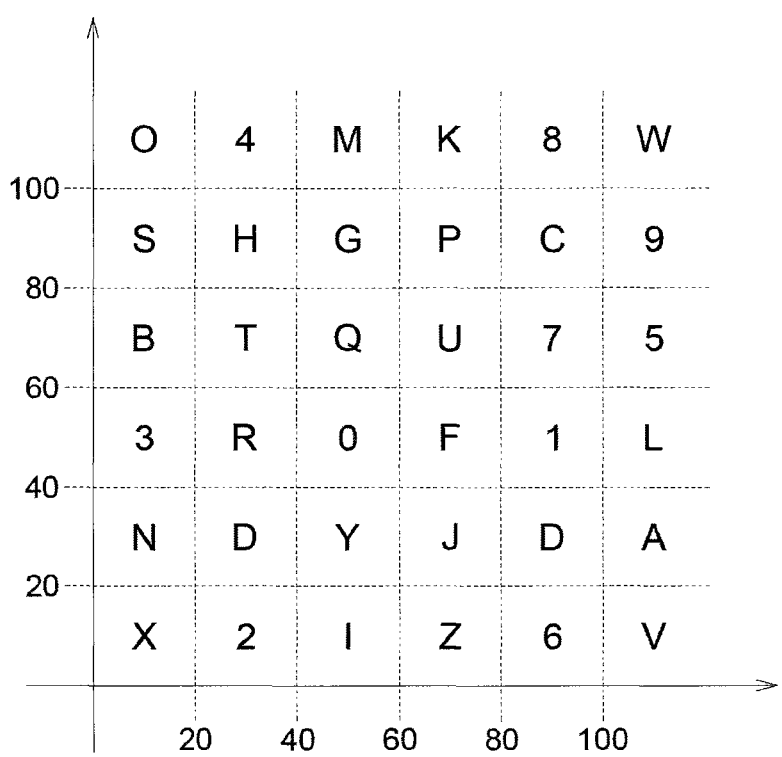
FIG. 18 shows a diagram illustrating an example for token mapping.

In some embodiments, the process of token mapping is a value-mapping algorithm which deterministically maps a given index token into a value by a nonlinear function. A simple nonlinear function use a technique called bucketing. For examples, as shown in FIG. 18, an index token of 2-tuple vector (72, 14) is mapped into "Z"; while a token vector (23, 45) is mapped into "R". Index tokens with more than 2 tuples require the nonlinear function to be multi-dimension. Such a nonlinear function can extend the number of dimensions from two, such as the example in FIG. 18, to more.

In some embodiments, the process of token mapping includes an OPE. Since OPE has a property that if a value A is bigger than a value B, then the value OPE(A) is bigger than the value OPE(B). In short, OPE preserves the relation of order, and can be used to map a token into a value proportional to the magnitude of token. In one embodiment, the magnitude is calculated as the sum of all the values within the token, while in another embodiment, the magnitude is the weighted sum of all the values within the token. Since OPE preserves the order of magnitudes of the token, so instead of using subsequence string matching, numerical pattern matching is also applicable.

Note that, in FIG. 16, though the gray scaled picture is taken as an example to reveal the concept, the method also applies to pictures with color pixels of three values of R (Red), G (Green), B (Blue) or the like. There are well-known formulas to transform R, G, and B values into gray values. It is worthy to mention that, generating gray pictures from color pictures for index can emphasize "contour" matching, which is often useful when exact colors are not the major concern. Besides, though the example picture is only 11-by-13 for the purpose of clear illustration, pictures of any resolution can be scaled to a fixed reference dimension for indexing purpose. Regarding the data-retrieval mechanism enabled by the method, the actual-resolution pictures may be encrypted independently.

Figure 19:
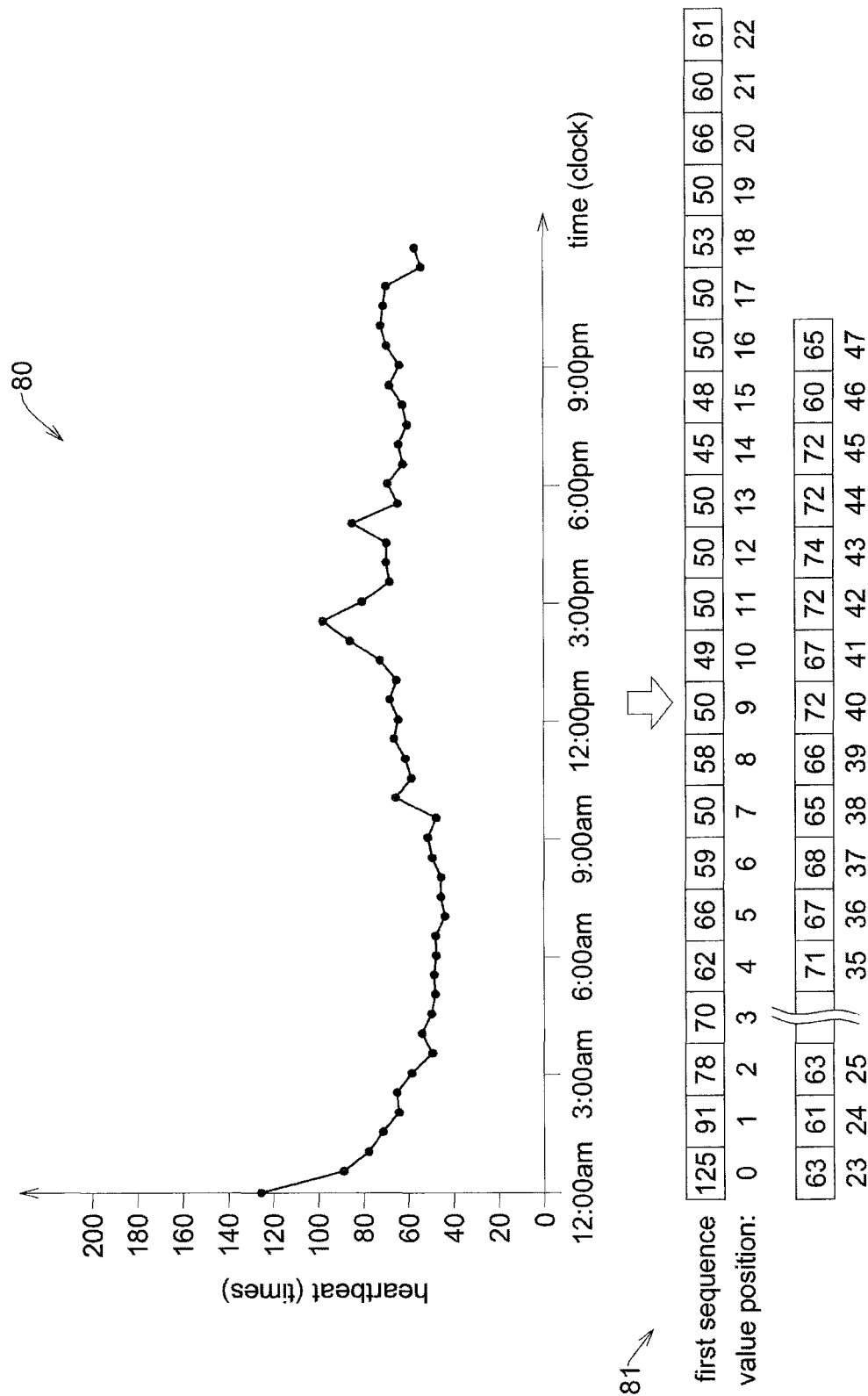
FIG. 19 shows an example of one dimension data of daily record.

In some embodiments, as shown in FIG. 19, a daily record 80 of heartbeat rates visualizes the volume of works taken by the person, and more or less can hint the person ways to improve his life. However, such records also provide clue to what kind of activity a person ever took if such records are exposed to malicious parties. Such a piece of data is considered private and is suggested to be encrypted before storing to a remote storage. However, to facilitate a possible latter retrieval, it may be indexed by the embodiments of this disclosure. As such one dimension data can be easily transformed into a sequence of values, when the first sequence of these 48 integer values are transformed according to the embodiment of the disclosure, a secure index of specified length can be generated.

In conclusion, the present disclosure discloses a method, computer program product and processing system for generating secure alternative representation. By using the method according to the present disclosure, the first sequences are transformed into secure indexes, and query-words are transformed into secure trapdoors to hide the associated information; wherein the secure trapdoors serve as a clue to identify one or more of the secure indexes without exposing the query-words and the first sequences; wherein the query-word may contains wildcards, and each wildcard represents an arbitrary value.

It is intended that the specification and examples be considered as exemplary only, for those skilled in the art that various modifications and variations can be made in accordance with the disclosed embodiments of the present application, and such modifications and variations are to be understood as being included within the scope of embodiments of the invention as defined by the following claims.

What is claimed is:

1. A method, in a processing system comprising one or more processing units and one or more storage units, for generating secure alternative representation, comprising:
   providing, by the processing system, a first sequence comprising a plurality of first values;
   providing, by the processing system, a plurality of storage cells belonging to a plurality of groups, each of the groups having one or more storage cells;
   performing, by the processing system, for each of the storage cells a symbol-deriving and cell-filling procedure, comprising:
      deriving, by the processing system, one or more secret pointers, each of the one or more secret pointers pointing to one of the first values;
      forming, by the processing system, a token by putting together one or more of the first values which are pointed by the one or more secret pointers;
      mapping, by the processing system, the token into a symbol; and
      filling, by the processing system, the symbol into one of the storage cells;
   composing, by the processing system, a queue for each of the groups by picking up one or more symbols filled in the one or more storage cells of a corresponding one of the groups; and
   generating, by the processing system, a secure alternative representation for the first sequence by concatenating the composed queue for each of the groups.

2. The method according to claim 1, wherein the composing the queue for each of the groups is by picking up all said symbol or symbols filled in the one or more storage cells of the corresponding one of the groups, and the generated secure alternative representation is used as a secure index.

3. The method according to claim 1, wherein the composing the queue for each of the groups is by picking up at most one symbol filled in the one or more storage cells of the corresponding one of the groups, and the generated secure alternative representation is used as a secure trapdoor.

4. The method according to claim 1, wherein the first values include one or more wildcards representing any values; and when at least one of the one or more secret pointers point to at least one of the one or more wildcards or a corresponding formed token contains at least one of the one or more wildcards, the symbol-deriving and cell-filling procedure for a corresponding storage cell with the corresponding formed token contains at least one of the one or more wildcards halts.

5. The method according to claim 1, wherein the first values are either of a plurality of character encodings for representing textual data, or of a plurality of numerical values for representing numerical data.

6. The method according to claim 1, wherein each of the one or more secret pointers for each of the one or more storage cells is derived from at least one of the followings: a piece of memory pre-filled with pointer values, and an algorithm outputting pseudo random values according to inputs of at least one of the followings: a secret key, a secret phrase, an user identification, a location identification and a time identification.

7. The method according to claim 1, wherein the mapping is performed by at least one of the following: a look-up table, a value-mapping algorithm, a secure hashing algorithm (SHA), a keyed-hash message authentication code (HMAC), an encryption algorithm, an Order-Preserving Encryption (OPE), or a combination thereof.

8. The method according to claim 1, wherein the first sequence is derived by extending a second sequence of values, such that the first sequence retains values of the second sequence and contains additional values derived from at least one of the followings: the values of the second sequence, a length of the second sequence, a secret key, a secret phrase, an user identification, a location identification, and a time identification.

9. The method according to claim 1, wherein the picking up in the composing the queue is performed according to a random sequence which determines the symbol or symbols to be picked and an order of the picked symbol or symbols to be placed in the queue, and the random sequence is generated by feeding a pseudo random generation algorithm with at least one of the followings: a seed, a secret key, a secret phrase, an user identification, a location identification, and a time identification.

10. The method according to claim 1, wherein the concatenating in the generating the secure alternative representation is performed according to a random sequence which determines a concatenating order of the composed queue or queues of each of the groups, and the random sequence is generated by feeding a pseudo random generation algorithm with at least one of the followings: a seed, a secret key, a secret phrase, an user identification, a location identification, and a time identification.

11. A computer program product comprising a non-transitory computer readable medium having a computer readable program stored therein, wherein the computer readable program, when executed on a processing system, causes the processing system to:
provide, a first sequence comprising a plurality of first values;
provide, a plurality of storage cells belonging to a plurality of groups, each of the groups having one or more storage cells;
perform, for each of the storage cells a symbol-deriving and cell-filling procedure, comprising:
deriving, one or more secret pointers, each of the one or more secret pointers pointing to one of the first values;
forming, a token by putting together one or more of the first values which are pointed by the one or more secret pointers;
mapping, the token into a symbol; and
filling, the symbol into one of the storage cells;
compose, a queue for each of the groups by picking up one or more symbols filled in the one or more storage cells of a corresponding one of the groups; and
generate, a secure alternative representation for the first sequence by concatenating the composed queue for each of the groups.

12. The computer program product according to claim 11, wherein the composing the queue for each of the groups is by picking up all said symbol filled in the one or more storage cells of the corresponding one of the groups, and the generated secure alternative representation is used as a secure index.

13. The computer program product according to claim 11, wherein the composing the queue for each of the groups is by picking up at most one symbol filled in the one or more storage cells of the corresponding one of the groups, and the generated secure alternative representation is used as a secure trapdoor.

14. The computer program product according to claim 11, wherein the first values include one or more wildcards defined to represent any values; and when at least one of the one or more secret pointers points to at least one of the one or more wildcards or a corresponding formed token contains at least one of the one or more wildcards, the symbol-deriving and cell-filling procedure for a corresponding storage cell with the corresponding formed token contains at least one of the one or more wildcards halts.

15. The computer program product according to claim 11, wherein the first values are either of a plurality of character encodings for representing textual data, or of a plurality of numerical values for representing numerical data.

16. The computer program product according to claim 11, wherein each of the one or more secret pointers for each of the one or more storage cells is derived from at least one of the followings: a piece of memory pre-filled with pointer values, and an algorithm outputting values according to inputs of at least one of the followings: a secret key, a secret phrase, an user identification, a location identification and a time identification.

17. The computer program product according to claim 11, wherein the mapping is performed by at least one of the following: a look-up table, a value-mapping algorithm, a secure hashing algorithm (SHA), a keyed-hash message authentication code (HMAC), an encryption algorithm, an Order-Preserving Encryption (OPE), or a combination thereof.

18. The computer program product according to claim 11, wherein the first sequence is derived by extending a second sequence of values, such that the first sequence retains values of the second sequence and contains additional values derived from at least one of the followings: the values of the second sequence, a length of the second sequence, a secret key, a secret phrase, an user identification, a location identification, and a time identification.

19. The computer program product according to claim 11, wherein the picking up in the composing the queue is performed according to a random sequence which determines the symbol or symbols to be picked and an order of the picked symbol or symbols to be placed in the queue, and the random sequence is generated by feeding a pseudo random generation algorithm with at least one of the followings: a seed, a secret key, a secret phrase, an user identification, a location identification, and a time identification.

20. The computer program product according to claim 11, wherein the concatenating in the generating the secure alternative representation is performed according to a random sequence which determines a concatenating order of the composed queue or queues of each of the groups, and the random sequence is generated by feeding a pseudo random generation algorithm with at least one of the followings: a seed, a secret key, a secret phrase, an user identification, a location identification, and a time identification.

21. A processing system for generating secure alternative representation, comprising:
  one or more processing units; and
  one or more storage units, coupled to the one or more processing units, wherein the one or more storage units comprises instructions which, when executed by the one or more processing units, cause the one or more processing units to:
  provide, a first sequence comprising a plurality of first values;
  provide, a plurality of storage cells belonging to a plurality of groups, each of the groups having one or more storage cells;
  perform, for each of the storage cells a symbol-deriving and cell-filling procedure, comprising:
    deriving, one or more secret pointers, each of the one or more secret pointers pointing to one of the first values;
    forming, a token by putting together one or more of the first values which are pointed by the one or more secret pointers;
    mapping, the token into a symbol; and
    filling, the symbol into of the storage cells;
  compose, a queue for each of the groups by picking up the one or more symbols filled in the one or more storage cells of a corresponding one of the groups; and
  generate, a secure alternative representation for the first sequence by concatenating the composed queue for each of the groups.

* * * * *